United States Patent Office 2,992,225
Patented July 11, 1961

2,992,225
CERTAIN 4-(5-NITRO-2-FURYL)-THIAZOLES
Donald E. Dickson, Lake Bluff, Ill., assignor to Abbott Laboratories, North Chicago, Ill., a corporation of Illinois
No Drawing. Filed Sept. 14, 1959, Ser. No. 839,577
10 Claims. (Cl. 260—302)

This invention is directed to novel chemical compounds corresponding to the formula

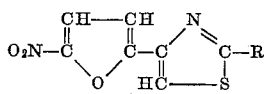

and a method for their preparation. In this and succeeding formulas, R represents hydrogen, hydroxyl, SH, S-loweralkyl, loweralkyl, NH$_2$, NH-loweralkyl, NHCO-loweralkyl or NH-aryl. The term "loweralkyl" as employed herein refers to the alkyl radicals containing from 1 to 4 carbon atoms, inclusive. These new compounds are crystalline solids which are substantially insoluble in water. They are active as parasiticides and more particularly as antibacterial agents. They may, therefore, be employed as active toxic constituents of disinfectant compositions for the control of bacteria such as *Micrococcus pyogenes var. aureus*, *Salmonella typhimurium* and *Escherichia coli*. In such use, the compounds may be dispersed on an inert, finely divided solid and employed as a dust or they may be dispersed in water and employed as a spray. Alternatively, the products may be employed as constituents of oil and water emulsions with or without a wetting, dispersing or emulsifying agent. In representative operations, 2-amino-4-(5-nitro-2-furyl)-thiazole gave complete inhibition of the growth of the above-named microorganisms when employed as an aqueous composition containing 25 parts by weight of said compound per million parts by weight of ultimate mixture.

The compounds of the present invention may be prepared by the following reaction wherein X represents chlorine or bromine:

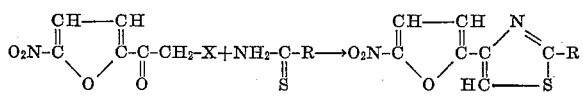

The reaction is carried out in the presence of an inert organic solvent such as alcohol. Good results are obtained when employing substantially equimolecular proportions of the reactants. The reaction takes place smoothly at temperatures of from about 25° to 100° C. with the formation of the desired product and hydrohalide of reaction. Upon completion of the reaction, the desired product may be separated in conventional fashion.

In carrying out the reaction, the solid halomethyl-5-nitro-2-furyl ketone is dissolved preferably in the reaction solvent and added portionwise to a solution of the NH$_2$CS-R reactant in the same solvent. The reaction is carried out with stirring and at a temperature of from 25° to 100° C. The reaction mixture is then cooled to precipitate the desired product which is separated by filtration and purified by crystallization from alcohol or some other suitable solvent.

The compounds of the present invention wherein R is acylamino can be prepared in an alternative method by the reaction of 2-amino-4-(5-nitro-2-furyl)-thiazole hydrohalide with a loweralkyl anhydride such as acetic anhydride, propionic anhydride or a butyric anhydride. In carrying out the reaction, the thiazole hydrohalide (preferably the hydrobromide) is suspended in a molecular excess of the anhydride and the resulting mixture heated at the boiling temperature and under reflux to complete the reaction. Upon completion of the reaction, the reaction mixture is cooled to precipitate the desired product or evaporated to dryness and the residue recrystallized from a suitable solvent.

The following examples illustrate the invention but are not to be construed as limiting.

EXAMPLE 1

*2-amino-4-(5-nitro-2-furyl)-thiazole*

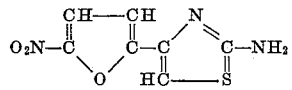

A mixture of 10 grams (0.043 mole) of bromomethyl-5-nitro-2-furyl ketone and 3.2 grams (0.043 mole) of thiourea in 50 ml. of alcohol was heated on a steam bath until a solid crystallized from the mixture. The reaction mixture was then cooled and the desired 2-amino-4-(5-nitro-2-furyl)-thiazole separated by filtration as the crystalline hydrobromide. After recrystallization from alcohol, the product melted at 233°–235° C. with decomposition. Anal. calc'd. for C$_7$H$_5$N$_3$O$_3$S·HBr: C=28.78%; H=2.07%; N=14.38%. Found: C=28.87%; H=2.04%; N=14.19%.

EXAMPLE 2

*2-methylamino-4-(5-nitro-2-furyl)-thiazole*

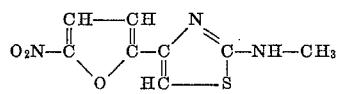

This compound was prepared as a crystalline hydrobromide by the reaction of equimolecular proportions of bromomethyl-5-nitro-2-furyl ketone and methylthiourea in the same manner as that described in Example 1. The desired product melted at 191°–193° C. with decomposition and was found to contain 13.70% nitrogen compared to the calculated value of 13.73% nitrogen.

EXAMPLE 3

*2-ethylamino-4-(5-nitro-2-furyl)-thiazole*

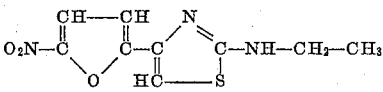

In the same manner as that described in Example 1, equimolecular amounts of bromomethyl-5-nitro-2-furyl ketone and ethylthiourea were reacted to obtain the above-named product which melted at 158°–159° C. and upon analysis was found to contain 17.65% nitrogen which corresponds to the calculated value.

EXAMPLE 4

*2-acetamido-4-(5-nitro-2-furyl)-thiazole*

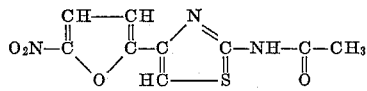

One gram (0.0034 mole) of the product obtained in Example 1 was suspended in 30 ml. of acetic anhydride and the resulting mixture heated at the boiling temperature and under reflux for about 30 minutes. After cooling the reaction mixture, the desired 2-acetamido-4-(5-nitro-2-furyl)-thiazole was obtained as an orange solid. After recrystallization from alcohol, the product melted at 295°–296° C. with decomposition. Anal. calc'd. for C$_9$H$_7$N$_3$O$_4$S: C=42.69%; H=2.79%; N=16.59%. Found: C=42.98%; H=2.69%; N=16.54%.

EXAMPLE 5

*2-propionamido-4-(5-nitro-2-furyl)-thiazole*

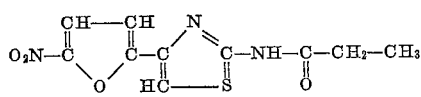

Two grams (0.0069 mole) of 2-amino-4-(5-nitro-2-furyl)-thiazole was suspended in 100 ml. of propionic anhydride and the resulting mixture heated at 100° C. for about 10 minutes to complete the reaction. The reaction mixture was then poured into ice water and allowed to stand until the desired product precipitated. After recrystallization from alcohol, the 2-propionamido-4-(5-nitro-2-furyl)-thiazole melted at 223°–225° C. and contained 15.68% nitrogen compared to the calculated value of 15.72% nitrogen.

EXAMPLE 6

*2-methyl-4-(5-nitro-2-furyl)-thiazole*

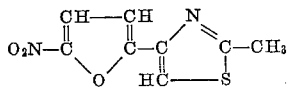

Thirty grams (0.129 mole) of bromomethyl-5-nitro-2-furyl ketone was added portionwise with stirring at room temperature to 9.6 grams (0.129 mole) of thioacetamide dissolved in 120 ml. of alcohol. The resulting solution was heated on a steam bath for 30 minutes to complete the reaction and thereafter cooled to precipitate the desired product which was separated by filtration. After recrystallization from alcohol, the 2-methyl-4-(5-nitro-2-furyl)-thiazole was found to melt at 140°–141° C. Anal. calc'd. for $C_8H_6N_2O_3S$: C=45.67%; H=2.88%; N=13.33%. Found: C=45.63%; H=2.94%; N=13.11%.

EXAMPLE 7

*2-methylthio-4-(5-nitro-2-furyl)-thiazole*

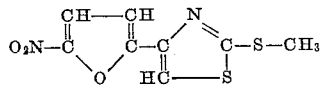

A solution of 1.84 grams (0.172 mole) of methyl dithiocarbamate in 10 ml. of alcohol was added portionwise with stirring at 60° C. to a solution of 4.0 grams (0.172 mole) of bromomethyl-5-nitro-2-furyl ketone in 30 ml. of alcohol. Heating was thereafter continued for 10 minutes after which time the reaction mixture was cooled to precipitate a yellow solid. This solid was filtered off and recrystallized first from alcohol then from ethyl acetate to obtain the 2-methylthio-4-(5-nitro-2-furyl)-thiazole which melted at 140°–142° C. Anal. calc'd. for $C_8H_6N_2O_3S_2$: C=39.65%; H=2.50%; N=11.56%. Found: C=39.81%; H=2.67%; N=11.82%.

EXAMPLE 8

*2-ethylthio-4-(5-nitro-2-furyl)-thiazole*

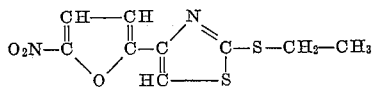

This compound was prepared in the same manner as that described in Example 7 by the reaction of equimolecular proportions of bromomethyl-5-nitro-2-furyl ketone and ethyl dithiocarbamate. After crystallization from alcohol, the product 2-ethylthio-4-(5-nitro-2-furyl)-thiazole melted at 120°–121° C. Anal. calc'd. for $C_9H_8N_2O_3S_2$: C=42.17%; H=3.15%; N=10.93%. Found: C=42.07%; H=3.31%; N=10.77%.

EXAMPLE 9

*2-phenylamino-4-(5-nitro-2-furyl)-thiazole*

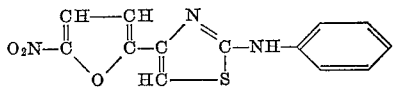

To a solution of 1.3 grams (0.0086 mole) of phenylthiourea in 30 ml. of alcohol was added 2 grams (0.0086 mole) of bromomethyl-5-nitro-2-furyl ketone. The temperature rose to 70° C. where it was maintained for 2 minutes. The reaction mixture was then cooled and poured into ether to precipitate a white solid. The solid was filtered off and refluxed in 30 ml. of pyridine until solution was complete. The pyridine solution was thereafter poured into ice water at which time a dark oil formed which solidified upon standing. After recrystallization from alcohol, there was obtained as a crystalline solid the desired 2-phenylamino-4-(5-nitro-2-furyl)-thiazole melting at 141°–143° C. Anal. calc'd. for $C_{13}H_9N_3O_3S$: C=54.34%; H=3.16%; N=14.63%. Found C=54.45%; H=3.34%; N=14.51%.

In a manner similar to that described in Example 1, other compounds contemplated to be within the scope of the present invention may be prepared as follows: by the reaction of chloromethyl-5-nitro-2-furyl ketone with n-propyl dithiocarbamate, tert.-butyl dithiocarbamate, thiopropionamide, thiobutyramide, thiovaleramide, dithiocarbamic acid, monothiocarbamic acid or thioformamide, respectively, there is obtained 2-n-propylthio-4-(5-nitro-2-furyl)-thiazole; 2-tert.-butylthio-4-(5-nitro-2-furyl)-thiazole; 2-ethyl-4-(5-nitro-2-furyl)-thiazole; 2-propyl-4-(5-nitro-2-furyl)-thiazole; 2-butyl-4-(5-nitro-2-furyl)-thiazole; 2-thio-4-(5-nitro-2-furyl)-thiazole; 2-hydroxyl-4-(5-nitro-2-furyl)-thiazole and 5-nitro-2-furyl thiazole.

Likewise, by following the procedure described in Example 4, 2-amino-4-(5-nitro-2-furyl)-thiazole can be reacted with butyric anhydride or valeric anhydride to obtain 2-butyramido-4-(5-nitro-2-furyl)-thiazole and 2-valeramido-4-(5-nitro-2-furyl)-thiazole, respectively.

What I claim as my invention is:

1. Compounds corresponding to the formula

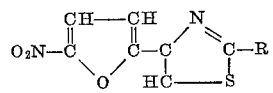

wherein R is a member of the group consisting of hydrogen, SH, OH, S-loweralkyl, $NH_2$, NH-loweralkyl, NHCO-loweralkyl and NH-phenyl.

2. 2-amino-4-(5-nitro-2-furyl)-thiazole.
3. 2-methylamino-4-(5-nitro-2-furyl)-thiazole.
4. 2-ethylamino-4-(5-nitro-2-furyl)-thiazole.
5. 2-acetamido-4-(5-nitro-2-furyl)-thiazole.
6. 2-propionamido-4-(5-nitro-2-furyl)-thiazole.
7. 2-methyl-4-(5-nitro-2-furyl)-thiazole.
8. 2-methylthio-4-(5-nitro-2-furyl)-thiazole.
9. 2-ethylthio-4-(5-nitro-2-furyl)-thiazole.
10. 2-phenylamino-4-(5-nitro-2-furyl)-thiazole.

References Cited in the file of this patent

UNITED STATES PATENTS

| | | |
|---|---|---|
| 2,659,719 | Dickey et al. | Nov. 17, 1953 |
| 2,703,324 | Binkley et al. | Mar. 1, 1955 |
| 2,768,207 | Cheney et al. | Oct. 23, 1956 |

OTHER REFERENCES

Knott: Chem. Abstracts, vol. 42, col. 2969 (1948).

Elderfield: "Heterocyclic Compounds," vol. 5, pp. 496–501 (1957).